Figure 1:
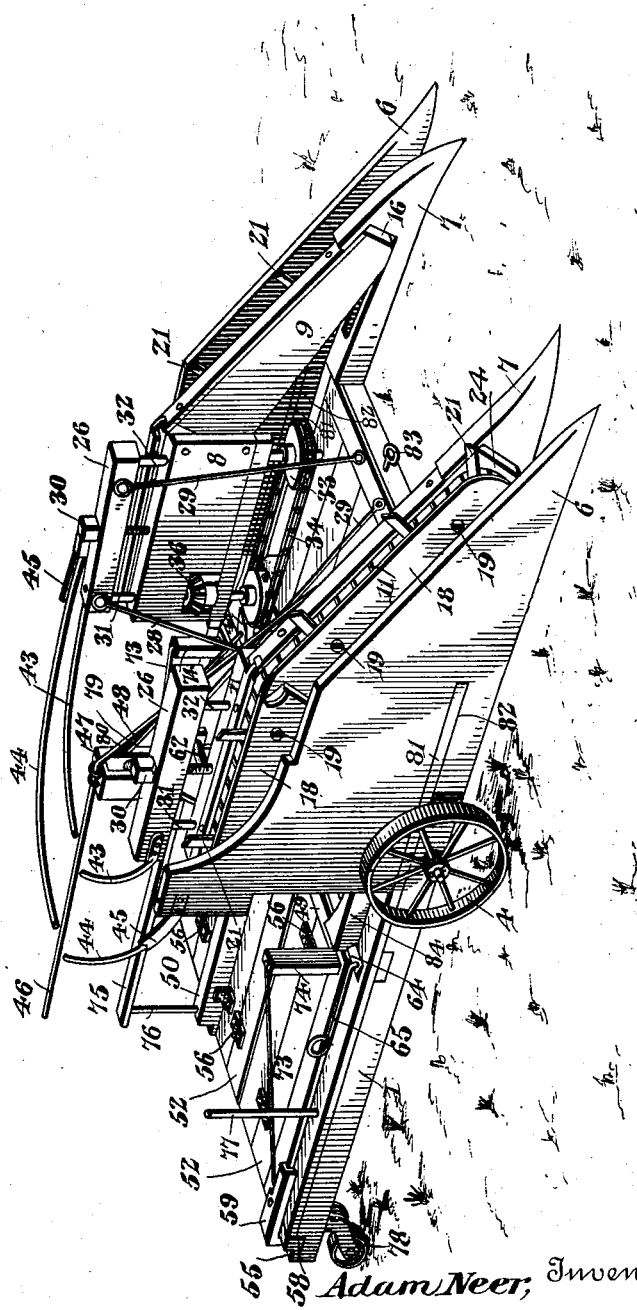

No. 754,491. PATENTED MAR. 15, 1904.
A. NEER.
CORN HARVESTER.
APPLICATION FILED FEB. 25, 1901.
NO MODEL. 3 SHEETS—SHEET 1.

Adam Neer, Inventor

Witnesses

By

Attorney

No. 754,491. PATENTED MAR. 15, 1904.
A. NEER.
CORN HARVESTER.
APPLICATION FILED FEB. 25, 1901.
NO MODEL. 3 SHEETS—SHEET 2.

Adam Neer, Inventor

Witnesses

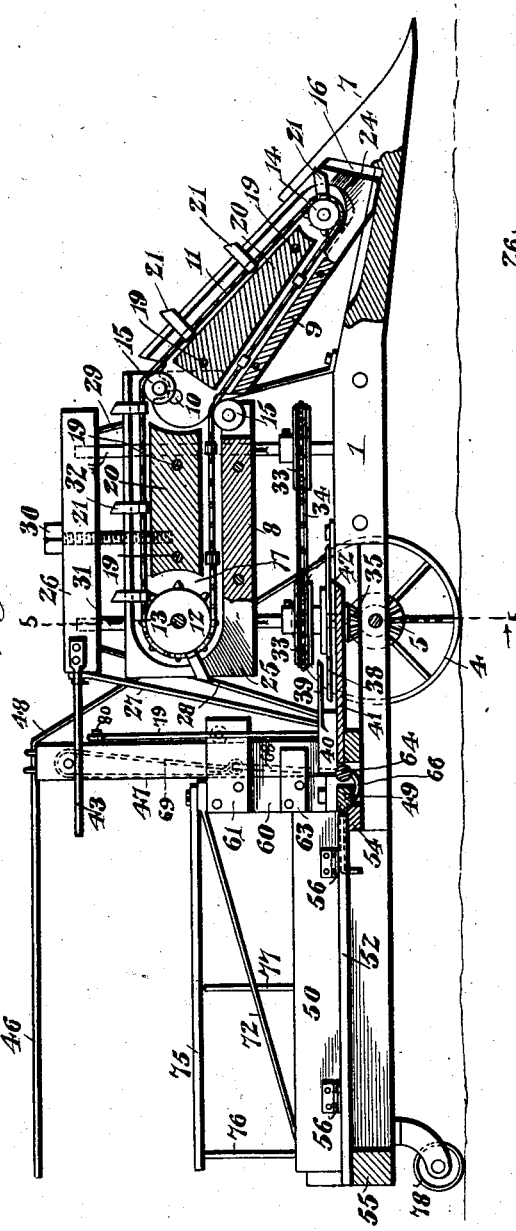

No. 754,491. Patented March 15, 1904.

UNITED STATES PATENT OFFICE.

ADAM NEER, OF ST. PARIS, OHIO.

CORN-HARVESTER.

SPECIFICATION forming part of Letters Patent No. 754,491, dated March 15, 1904.

Application filed February 25, 1901. Serial No. 48,795. (No model.)

*To all whom it may concern:*

Be it known that I, ADAM NEER, a citizen of the United States, residing at St. Paris, in the county of Champaign and State of Ohio, have invented a new and useful Corn-Harvester, of which the following is a specification.

This invention relates to corn-harvesters; and the object in view is to provide a light-draft machine of the class described which is capable of being drawn along the field by one horse and which is adapted to simultaneously operate upon two adjoining rows of corn, the machine embodying gathering and guiding mechanism for directing and conveying the corn to the cutters, cutting mechanism for severing the stalks, mechanism for forming a shock in rear of the cutters, a platform for supporting the shock being formed, and mechanism for dumping the platform and releasing the shocks from the machine.

One of the principal objects of the invention is to provide a novel form of gathering mechanism embodying, in connection with drive or sprocket chains, gathering-fingers which are mounted to travel partly in an inclined path and partly in a substantially horizontal direction, the said fingers being adapted to fold out of the way in their return movement, so as not to interfere with the incoming stalks. In connection with such sprocket-chain and gathering-fingers I provide means for elevating or raising and lowering the drive-chain, so as to adapt the machine as a whole to operate upon corn of different height, and also to effectively engage leaning stalks and direct the same backward to the cutting apparatus.

Another important object of the invention is to provide a dumping-platform upon which the shocks are formed and to construct said platform of flexibly-connnected sections, which are attached to a vertically-movable frame having operating mechanism connected therewith for raising and lowering said frame for the purpose of withdrawing the supporting-platform sections from beneath the shocks and dropping the latter upon the ground.

Another object of the invention is to provide, in connection with the sectional dumping-platform, a combined supporting-bar for the platform and a releasing device or gate for permitting the discharge of the shocks and to provide the platform-frame with means for locking the said supporting-bar and releasing device during the formation of the shocks.

A further object of the invention is to provide a cut-off for preventing the corn from passing backward upon the platform as the shocks are being discharged, which cut-off is operated automatically by the dumping-platform during the operation of the latter.

In carrying out the objects above recited it is also an object of this invention to dispense with as much gearing as possible in order to provide a light construction of harvester and produce a machine of light draft which may be easily drawn by a single draft-animal.

With the above and other objects in view, which will more fully appear as the nature of the improvements is set forth, the invention consists in the novel construction, combination, and arrangement hereinafter fully described, illustrated, and claimed.

Figure 2:
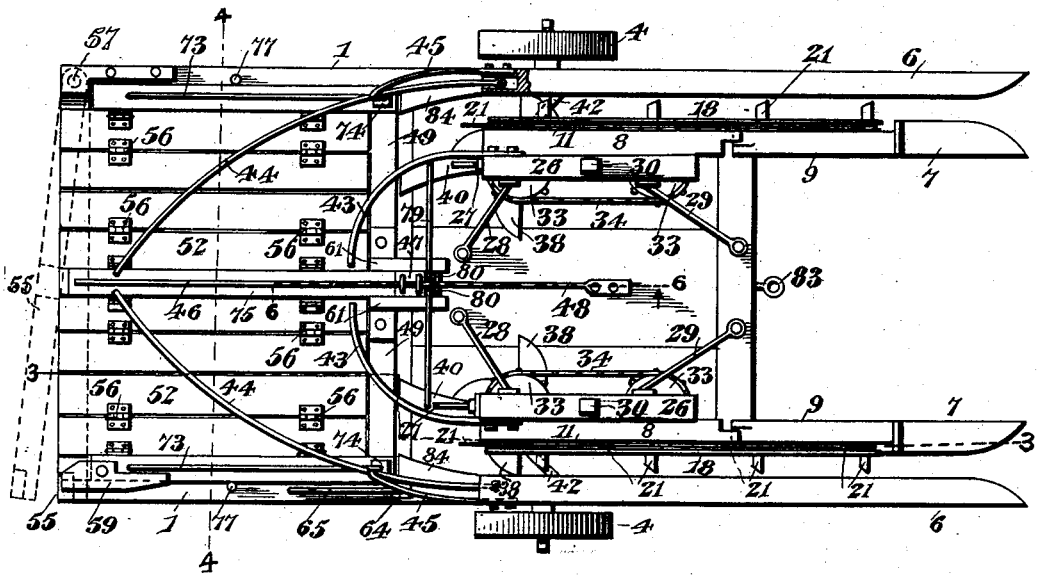
Figure 4:
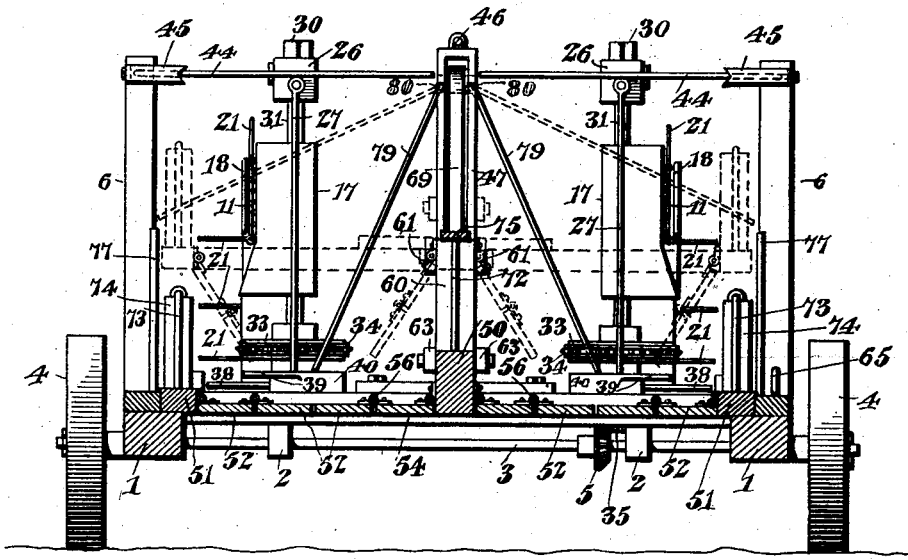

In the accompanying drawings, Figure 1 is a perspective view of a corn-harvester complete constructed in accordance with the present invention. Fig. 2 is a plan view of the same, showing the shock-releasing and platform-supporting bar moved partially outward in dotted lines. Fig. 3 is a vertical longitudinal section through the machine, taken on the line 3 3 of Fig. 2. Fig. 4 is a vertical transverse section taken on the line 4 4 of Fig. 2 through the shock-holding platform and illustrating by dotted lines the position the parts assume in the act of dumping the platform. Fig. 5 is a detail vertical transverse section taken on the line 5 5 of Fig. 3, showing the manner of driving the corn-gathering chains, &c. Fig. 6 is an enlarged vertical longitudinal section taken on the line 6 6 of Fig. 2 and showing a portion of the mechanism for dumping the platform.

Similar numerals of reference designate corresponding parts in all the figures of the drawings.

The corn-harvester contemplated in this invention comprises a suitable frame embodying, essentially, a pair of longitudinally-extending main platform-sills 1, between which are arranged other intermediate sills 2, the sills 1 and 2 being provided with bearings for the main axle 3, upon which the carrying and drive wheels 4 are mounted. The axle 3 is provided at a suitable point with bevel gear-wheels 5, fast thereon, and by means of which motion is communicated to the gathering mechanism, as will hereinafter appear.

The machine which is adapted to simultaneously operate upon two adjoining rows of corn is of sufficient width to extend across both rows and is provided at opposite sides with two sets of dividers, each set comprising an outer divider-board 6 and an inner divider-board 7. These dividers taper or contract in width toward their front ends, where they are diverged or flared in order to form splayed entrance-throats for the cornstalks, the corn being subsequently conducted between the divider-boards, which form the opposite walls of passages leading rearward to the cutting apparatus.

As the two sets of gathering devices are duplicates in every respect, it will only be necessary herein to describe the gathering mechanism on one side of the machine. Accordingly it may be stated that the inner divider-board is composed for the greater part of a sectional frame, comprising the sections 8 and 9, the said sections being hinged together by means of the pivot 10. The rearmost section 8 is disposed substantially in a horizontal plane, while the forward section, which is adapted to swing relatively to the rear section, is normally inclined and extended downward toward the front end of the apparatus, as clearly shown in Figs. 1 and 3. Extending lengthwise of the sections 8 and 9 is a sprocket-chain 11, which passes around a driving sprocket-wheel 12 on a stud-shaft 13, mounted near the rear end of the frame-section 8, and at its opposite end around a smaller idle sprocket-wheel 14, carried by the forward end of the hinged and inclined section 9. At intermediate points the chain 11 passes over direction-pulleys 15, journaled at or near the forward end of the frame-section 8 and on opposite sides of the pivot 10, which connects the sections 8 and 9. At this point it may be noted that the pivot 10 is arranged above or to one side of the longitudinal center of the hinged frame-sections in order to prevent the undue tightening or slackening of the chain 11 when the section 8 is raised or lowered by the mechanism hereinafter described. The forward end of the inner divider 7 is recessed, as shown at 16, to slidably receive the forward end of the frame-section 9 during the adjustment of the frame-section 8.

The sections 8 and 9 are closed at one side by a side wall 17, and they are partially closed at the opposite side by a removable side wall 18, held in place by means of bolts or other suitable fasteners 19. The outer frame-plates or walls 18 are also provided with webs 20, which project partially across the space between the plates 17 and 18 and form ledges for supporting the upper portion of the chain 11 when the same becomes loose and sags. Connected pivotally to the chain 11 at intervals are folding gathering-fingers 21, said fingers being hinged to the side portions of certain links of the chain, so as to turn on axes parallel to the length of the chain, so that they may fold laterally with respect to the chain. At the upper portions of the sections 8 and 9 openings or grooves 22 are left, through which the gathering-fingers 21 may project in a vertical direction, as shown in Fig. 5, the wall or plate 18 holding the fingers in a vertical position during their return movement and preventing them from interfering with the rearward movement of the cornstalks.

In line with the lower portion of the chain 11 a laterally-opening groove or way 23 is provided, through which the gathering-fingers 21 may project laterally for the purpose of engaging the cornstalks as they travel rearward. The forward end of the inclined frame-section 9 is provided with an oblique or inclined surface 24, forming a finger-deflector which operates as the fingers move downward around the sprocket-wheel 14 to rock said fingers outward and cause them to project horizontally, as shown in Fig. 2, during their rearward movement along the groove or way 23. As the fingers in their rearward movement approach the sprocket-wheel 12 they are acted upon by the beveled lower edge of the frame-plate 18, which extends somewhat in rear of the sprocket-wheel 12, and are forced inward, so as to extend radially from the chain as it passes around the sprocket-wheel 12, the adjacent face of the frame member 8 being beveled or inclined, as shown at 25, to admit of the inward folding movement of the gathering-fingers. In this way it will be seen that as the fingers move rearward and engage and carry backward the cornstalks they are caused to project laterally across or partially across the passage between the divider-boards, and after carrying the corn backward to the cutting apparatus, which is located about in line with the rear end of the conveyer-chain, they are caused to fold inward, and in their return movement they extend vertically upward from the forwardly-moving portion of the chain, so as not to interfere in any way with the operation of the lower train of fingers.

The mechanism for raising and lowering the frame-section 8 and the gathering-chain carried thereby comprises an elevated supporting-beam 26, which is arranged above the section 8 and supported by means of a series of braces 27, 28, and 29. Passing through the supporting-beam 26 is an elevating-screw 30, which enters a threaded opening in the frame-section 8 and has a swiveled engagement with the supporting-beam. By turning said screw the frame-section 8 will be fed upward or downward, as the case may be, and in this way the gathering-chain may be correspondingly raised and lowered for the purpose of adapting the machine to operate upon corn of different heights. The supporting-beam 26 is also provided with bearings for the upper ends of a pair of parallel vertical shafts 31 and 32, having their lower ends journaled in bearings connected with the main-platform sills 1. Said shafts 31 and 32 also pass through vertical openings in the frame-section 8, and thereby form guides upon which said frame-section slides vertically as it is adjusted by the elevating-screw 30. The shafts 31 and 32 are provided just above the sill 1 with sprocket-wheels 33, around which passes the lower conveyer-chain 34, which operates upon the lower portions of the stalks in a manner well understood by those familiar with the art to which this invention appertains. The rear sprocket-wheel 33 is mounted fast upon the main sprocket driving-shaft 31, which is provided at its lower end with a bevel-pinion 35, driven by the bevel gear-wheel 5 on the axle 3. The same shaft 31 is provided with another bevel-pinion 36, which meshes with a bevel gear-wheel 37, fixedly related to the sprocket-wheel 12, which drives the upper gathering-chain 11, hereinabove described, so that it will be seen that the same vertically-extending shaft 31 imparts motion to both the upper and lower conveyer-chain and drives the same at a speed commensurate with the movement of the harvester along the field. The shaft 31 and pinion 36 are rotatably connected in any convenient way, as by providing the shaft with a flat longitudinal surface at one side, so that the pinion may slide up and down on the shaft 31 when adjusting the frame-section 8, the shaft 31 and pinion 36 being always connected, so as to rotate together.

The cutting apparatus consists of a winged cutting-disk 38, which is mounted fast on the shaft 31 adjacent to the top of the platform-sill 1, the said cutting-disk being overhung by the arm 39 of a guard-block 40, mounted on the forward platform 41, upon which the grain is primarily received, said forward platform 41 terminating at the front in an inclined ledge plate or blade 42, against and in connection with which the winged cutter 38 operates.

Connected with the supporting-beam 26 and extending rearwardly therefrom is an inwardly-curving inner guide 43, while connected to the elevated rear end of the outer divider-board 6 is a yielding fender 44, which has its forward end pivotally connected to the divider-board 6 and held normally inward by means of a back spring 45, also secured at one end to the divider-board 6. The corn after being cut passes rearward between the yielding fender 44 and the guide 43 and accumulates against a central divider-rod 46, projecting rearward from the main center-post 47 and preferably extended forward therefrom and inclined downward to form a stay-rod 48, which is connected fixedly at its lower end to the forward platform, as shown in Fig. 6. The object in providing the yielding fender 44 is to allow the shocks after they are bound to be discharged from the machine in a manner which will hereinafter appear, the said fenders 44 being adapted to overcome the pressure of the springs 45 and yield outwardly to a sufficient extent to allow the shocks to pass by the rear ends thereof.

The dumping-platform, on which the shocks are formed, comprises a vertically-movable frame consisting of a cross-bar 49, having rigidly connected thereto a central longitudinal bar 50 and longitudinally-extending side bars 51, between which are arranged the flexibly-connected slats or sections 52 of the dumping-platform. The slats 52 extend longitudinally of the machine, and when in their lowermost position they form a support for the corn, which passes rearward between the guides 43 and the yielding fenders 44 and rests upon transverse supporting-bars 54 and 55, located, respectively, beneath the forward and rear edges of the platform-sections. The platform-sections are flexibly connected together by hinges 56 of any suitable description and are also flexibly connected by hinges to the central bar 50 and to the side bars 51. Centrally between the bars 50 and 51 the slats are disconnected, but arranged to lie closely together when the sections are in their downward position, resting on the cross-bars 54 and 55 in the manner illustrated in Fig. 4 in full lines. When the platform-section-carrying frame is elevated, the flexibly-connected sections attached to the bars 50 and 51 are raised and automatically swing away from each other, as shown by dotted lines in Fig. 4, so as to allow the shock to fall to the ground and rest thereon, this operation being preferably performed after the machine has been brought to a standstill. After the shocks have been bound the machine is driven ahead a short distance, and upon the rear cross-bar 55 coming in contact with the shocks said bar, which is pivotally connected at one end to one of the main longitudinal sills, as shown at 57, is caused to swing outward rearwardly, thus leaving the shocks standing in the field. Before lowering the platform to receive other shocks the operator swings the hinged crossbar 55 back to its normal position, where the free end thereof is received in a mortise or rabbet 58 in the rear end of one of the main sills, as shown in Fig. 1. The platform is then lowered, so that the flexibly-connected sections will rest upon the supporting-bars 54 and 55, whereupon the free end of the hinged bar or gate 55 will be held locked to the frame by means of a latch 59, which is arranged at one corner of the platform and carried by one of the side bars 51, as shown in Fig. 1.

Connected to the forward end of the central bar 50 and extending upward from the forward cross-bar 49 is a short standard 60, which lies in contact with or in close proximity to the main central post 47, hereinabove referred to, and is provided with a runner comprising parallel side plates 61, which extend forward and embrace the post 47 and carry a roller 62, which is journaled between the side members 61 and operates in contact with the forward side of the post 47, as shown in Fig. 3. At a lower point on the short standard 60 other parallel plates 63 are provided, which embrace the post 47 on opposite sides and serve to steady the up-and-down movements of the dumping-platform.

In order to raise and lower the dumping-platform, I provide a rock-shaft 64, which extends transversely of the machine-frame just in front of the cross-bar 49 of the platform, said rock-shaft being journaled in suitable bearings in the machine-frame and provided at one end with an operating or dumping lever 65, which is controlled from the side of the machine. At a point in line with the central bar 50 said rock-shaft is provided with a lifting-lever 66, which when the platform is down lies in a groove 67 in the lower side of the bar 50. Said lifting-lever 66 is provided with a rounded extremity 68, which operates in contact with the base of the groove 67 and lifts the platform-frame when the operating-lever 65 is vibrated in a manner that will be readily understood by an examination of Figs. 1, 3, and 6. The rock-shaft 64 is also provided with a centrally-located arm 68, to the extremity of which is connected a belt or strap 69, which passes upward over a pulley 70, supported near the top of the post 47, and thence downward, where it is connected at 71 to the short standard 60, the arm 68 and strap 69 forming auxiliary mechanism for raising and lowering the dumping-platform. The post 47 is preferably slotted or provided with an open center to receive the arm 68, strap 69, and pulley 70. A truss-rod 72 extends from the outer end of the central bar 50 forward and upward to the top of the short standard 60, to which it is connected for the purpose of bracing and preventing the sagging of the central bar 50. Similar truss-rods 73 extend from the outer ends of the side bars 51 forward and upward to the tops of posts 74, extending upward from the inner ends of the side bars 51, thus securely supporting the rear end of the platform as it is elevated and before it is relieved of the weight of the shocks carried by the platform-sections.

75 designates a divider-rail which extends from the top of the short standard 60 rearward and has its rear end supported by a post 76, extending upward from the bar 50. Side standards 77 extend upward from the main longitudinal platform-sills 1 to form lateral braces for the vertically-movable side bars 51 of the platform in order to prevent the spreading outward of said side bars during the raising and lowering of the platform. Supporting-wheels, preferably in the form of casters 78, are mounted beneath the rear end of the main longitudinal sills 1 to form efficient support for the rear of the machine.

In order to prevent the rearward movement of the corn during the discharge of the shocks, I provide a pair of automatically-operated cut-offs 79, preferably in the form of rods hinged at their upper ends, as at 80, to the central post 47 and resting against the side members 61 of the runner hereinabove described, so that as the runner moves upward on the post 47 the cut-offs 79 will be swung upward from the full-line position of Fig. 4 to the dotted-line position of the same figure, in which position they extend across the rear end of the passage between the divider-boards and prevent the corn from passing back upon the platform. When the platform is dropped or lowered, the cut-offs 79 are simultaneously moved from across the passage between the divider-boards, thereby allowing the corn to gain access to the shock-forming platform. The other divider-board, 6, is supported by means of a forwardly-extending strip 81, which is secured to the top of one of the main sills 1 and enters a longitudinal slot 82 in the outer divider-board, as shown in Fig. 1, the divider-board being secured to the strip 81 in any convenient manner so as to admit of its removal when access is required to the conveying-chains.

83 indicates a coupling-eye to which the draft-animal is hitched for drawing the machine along the field.

84 represents a pair of curved guides between which the butts of the cornstalks are directed onto the platform.

From the foregoing description it will be seen that I have provided a simple light-draft corn-harvesting machine capable of being drawn along the field by a single draft-animal and adapted to operate simultaneously upon two adjacent rows of corn; also, that the upper gathering-chain is made adjustable up and down for the purpose of adapting the machine to corn of different heights; further, that the corn after being cut is delivered upon a dumping-platform, an independent platform being used for each row of corn and the two platforms being arranged at opposite sides of the longitudinal center of the machine. It will further be seen that the platforms may be readily dumped for depositing the bound shocks upon the ground and that the rear cross-bar of the machine, which supports the platform-sections, will automatically swing outward to release the shocks and leave them standing in the field; further, that when the hinged rear cross-bar is returned to its normal position and the platform lowered said bar will be locked in its closed position, thereby adapting it to form an efficient support for the rear ends of the flexibly-connected platform-sections.

From the foregoing it is thought that the construction, operation, and many advantages of the herein-described invention will be apparent to those skilled in the art without further description, and it will be understood that various changes in the size, shape, proportion, and minor details of construction may be resorted to without departing from the spirit or sacrificing any of the advantages of the invention.

What I claim is—

1. In a corn-harvester, the combination with inner and outer divider-boards defining an intermediate passage having a splayed entrance-throat, said inner divider-board including a sectional frame, of cutting mechanism in rear of the passage, an endless conveyer-chain mounted upon said sectional frame and provided with foldable gathering-fingers, and means disposed adjacent to the opposite ends of the passage for moving the gathering-fingers to their operative and inoperative positions.

2. In a corn-harvester, the combination with inner and outer divider-boards defining an intermediate passage having a splayed entrance-throat, said inner divider-board including a sectional frame, of cutting mechanism in rear of said passage, means for adjusting the relative positions of the frame-sections, an endless conveyer-chain passed around the sectional frame and provided with foldable gathering-fingers, means located at the front end of the passage for moving the fingers to their operative positions, and means at the rear end of the passage for moving said fingers to their inoperative positions.

3. In a corn-harvester, the combination with rigidly-mounted inner and outer divider-boards defining an intermediate passage having a splayed entrance-throat, said inner divider-board including a sectional frame comprising a rear horizontal section and a front inclined section hinged thereto, of means for vertically adjusting the rear section of said frame, sprocket-wheels located at the front and rear ends of the frame, a conveyer-chain passed around the sprocket-wheels and provided with individually-swinging gathering-fingers, means for disposing said fingers in their horizontal positions during their rearward travel, means for retaining said fingers in their vertical positions during their forward travel, and cutting mechanism in rear of the passage between the divider-boards.

4. In a corn-harvester, the combination with a divider-board including a sectional frame, one section of which is downwardly and forwardly inclined and has sliding engagement with another section of the divider-board, sprocket-wheels mounted on the frame, a conveyer-chain passing around said sprocket-wheels and having gathering-fingers, and means for raising and lowering said frame.

5. In a corn-harvester, the combination with a conveyer-chain provided with gathering-fingers, of a vertically-movable frame carrying sprocket-wheels over which said chain passes, an elevated beam arranged above said frame, and an elevating-screw connecting said beam and frame for raising and lowering the latter.

6. In a corn-harvester, the combination with inner and outer divider-boards defining an intermediate passage for cornstalks, of a lower conveyer-chain movable around vertical axes, a vertically-movable frame disposed above said chain, an upper conveyer-chain carried by the frame, and mounted to move around horizontal axes and gearing arranged to maintain the operative connection between the chains at all times.

7. In a corn-harvester, the combination with inner and outer divider-boards defining an intermediate passage, said inner divider-board including a vertically-movable frame, a lower conveyer-chain below said frame, an upper conveyer-chain carried by the frame and provided with gathering-fingers, means for adjusting the frame vertically, and gearing between the upper and lower chains, said gearing being arranged to maintain the operative connection between the chains during the adjustment of the frame.

8. In a corn-harvester, the combination with inner and outer divider-boards defining an intermediate passage, said inner divider-board including a vertically-adjustable frame, of a pair of vertically-disposed shafts extending through said frame and constituting guides therefor, means for driving one of said shafts, a pinion mounted on said shaft and movable with the frame, and a conveyer-chain provided with gathering-fingers and geared to said pinion.

9. In a corn-harvester, the combination with inner and outer divider-boards defining an intermediate passage, of a pair of upstanding shafts, sprockets mounted on the lower ends of said shafts, a lower conveyer-chain passing around said sprockets, a vertically-movable frame guided upon said shafts and provided with sprockets, an upper conveyer-chain passed around the sprockets and provided with gathering-fingers, a pinion mounted on one of the shafts and geared to one of the sprocket-wheels carried by the frame, said pinion being movable with the frame as the latter is adjusted vertically, means for driving the shaft upon which the pinion is mounted, and means for effecting the vertical adjustment of the frame.

10. In a corn-harvester, a platform on which the shock is formed, comprising a vertically-movable frame, means for raising and lowering the same, comprising a rock-shaft carrying a lifting-arm engaging the platform and flexibly-connected platform-sections connected with said frame.

11. In a corn-harvester, a platform on which the shock is formed, comprising a vertically-movable frame having parallel longitudinal bars, a slatted floor having the sections thereof flexibly connected to each other and to said longitudinal bars, and means for raising and lowering said frame.

12. In a corn-harvester, a platform comprising a vertically-movable frame having parallel longitudinal bars, a platform-floor composed of sections flexibly connected to each other and to said parallel bars, means for raising and lowering the frame, and transversely-arranged supporting-bars located between the flexibly-connected sections.

13. In a corn-harvester, a platform comprising a vertically-movable frame, floor-sections flexibly connected to each other and to said frame, means for raising and lowering the frame, and a hinged bar connected to the machine-frame and forming a support for the rear portion of the platform-sections.

14. In a corn-harvester, a platform comprising a vertically-movable frame, floor-sections flexibly connected to each other and to said frame, means for raising and lowering the frame, a hinged beam forming a support for the rear portion of the platform, and a latch on the platform-frame adapted to interlock with said hinged supporting-bar.

15. In a corn-harvester, the combination with a vertically-movable platform comprising flexibly-connected floor-sections, of a rock-shaft provided with an operating-lever and also provided with means for raising and lowering the platform-frame.

16. In a corn-harvester, a dumping-platform comprising a vertically-movable frame, floor-sections flexibly connected to each other and to said frame, and means for raising and lowering the platform comprising a rock-shaft extending transversely of the machine-frame, an operating-lever connected with said shaft, and a lifting-lever connected to said rock-shaft and operating beneath the platform, substantially in the manner and for the purpose specified.

17. In a corn-harvester, the combination with a post, of a platform comprising a vertically-movable frame, a runner connected to said frame and movable up and down on said post, and flexibly-connected floor-sections carried by said frame.

18. In a corn-harvester, the combination with the gathering and cutting mechanism, of a post, a dumping-platform, a runner connected therewith and movable up and down on the post, and a cut-off hinged to said post and adapted to be vibrated by the runner as the latter moves up and down, said cut-off being designed to prevent the corn from reaching the platform during the operation of depositing the shock on the ground.

19. In a corn-harvester, the combination with inner and outer divider-boards defining a passage for the cornstalks, cutting mechanism in rear of the passage, a vertically-movable dumping-platform in rear of the cutting mechanism, and gathering devices for conveying the cornstalks through the passage to the cutting mechanism, of a cut-off located at the rear end of the passage, and means operated by the movement of the dumping-platform for presenting the cut-off across the rear end of the passage to prevent the corn from passing to the platform.

20. In a corn-harvester, the combination with a conveyer-chain having gathering-fingers, of a frame carrying sprocket-wheels for said chain and comprising a hinged downwardly-inclined forward section, and a divider-board section with which the inclined frame-section has a sliding connection.

21. In a corn-harvester, the combination with a conveyer-chain provided with foldable gathering-fingers, of a vertically-movable frame carrying sprocket-wheels over which said chain passes, a supporting-beam arranged above said frame, an elevating-screw connecting said beam and frame for raising and lowering the latter, and means carried by the frame to deflect the fingers.

22. In a corn-harvester, a platform on which the shock is formed comprising a vertically-movable frame having parallel longitudinal bars, a slatted floor having the sections thereof flexibly connected to each other and to the longitudinal bars, means for raising and lowering the frame comprising a transversely-disposed rock-shaft provided with an operating-lever and also provided with means for raising and lowering the platform-frame, the rock-shaft being journaled in suitable bearings in the machine-frame.

23. In a corn-harvester, the combination with a frame and cutting mechanism, of upper and lower conveyer-chains disposed in advance of the cutting mechanism and movable respectively around right-angularly-related axes, means for effecting the relative adjustment of the chains to accommodate stalks of different lengths, driving mechanism for said chains, and means for maintaining an operative connection between the chains and the driving mechanism irrespective of the relative adjustment of the chains.

24. A dumping-platform for corn-harvesters, comprising a vertically-movable frame, and a pair of separate floor-sections having hinged connection at their outer edges with the frame, whereby the vertical movement of said frame will cause the floor-sections to swing outwardly to dump the shock.

25. A dumping-platform for corn-harvesters comprising a vertically-movable frame having a pair of parallel bars, a pair of separate platform-sections hinged to said bars and disposed horizontally between the same, means for sustaining said sections in their normal positions, and means for elevating the frame to cause the platform-sections to swing outwardly and thereby dump the shock.

26. In a corn-harvester, the combination with inner and outer divider-boards defining an intermediate passage for the cornstalks, of cutting mechanism located at the inner end of the passage, a dumping-platform in rear of the cutting mechanism, and a cut-off operated by the movement of the dumping-platform to obstruct the rear end of the passage and thus prevent the passage of the stalks to the platform from the cutting mechanism.

27. A dumping-platform for corn-harvesters, comprising a vertically-movable frame, and a floor-section having hinged connection at its edge with the frame, whereby the vertical movement of said frame will cause the floor-section to swing downwardly and outwardly to dump the shock.

28. In a corn-harvester, the combination with inner and outer divider-boards defining an intermediate passage having a splayed entrance-throat, of upper and lower relatively adjustable conveyer-chains disposed to convey cornstalks through the passage and movable around right-angularly-related axes, folding gathering-fingers carried by one of the chains, and means for automatically moving the fingers into and out of their operative positions.

In testimony that I claim the foregoing as my own I have hereto affixed my signature in the presence of two witnesses.

ADAM NEER.

Witnesses:
   JOHN F. KELLY,
   F. D. MOSEY.